(12) United States Patent
Kroener et al.

(10) Patent No.: US 9,482,762 B2
(45) Date of Patent: Nov. 1, 2016

(54) GAMMA RAY DETECTOR AND METHOD OF DETECTING GAMMA RAYS

(71) Applicant: Infineon Technologies AG, Neubiberg (DE)

(72) Inventors: Friedrich Kroener, Villach (AT); Johannes Hacker, Villach (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 9 days.

(21) Appl. No.: 14/471,075

(22) Filed: Aug. 28, 2014

(65) Prior Publication Data

US 2016/0061967 A1    Mar. 3, 2016

(51) Int. Cl.
*G01T 1/28* (2006.01)
*G01T 1/24* (2006.01)

(52) U.S. Cl.
CPC .. *G01T 1/28* (2013.01); *G01T 1/24* (2013.01)

(58) Field of Classification Search
CPC .................................. G01T 1/24; G01T 1/28
See application file for complete search history.

(56) References Cited

U.S. PATENT DOCUMENTS

| | | | |
|---|---|---|---|
| 4,520,267 A | 5/1985 | Sipilä et al. | |
| 5,262,649 A * | 11/1993 | Antonuk | A61B 6/032 250/370.09 |
| 5,821,541 A | 10/1998 | Tuemer | |
| 6,989,539 B2 | 1/2006 | Wischmann et al. | |
| 7,208,743 B2 | 4/2007 | Luszik-Bhadra et al. | |
| 7,838,837 B2 | 11/2010 | Strueder et al. | |
| 2006/0131509 A1 | 6/2006 | Matz et al. | |
| 2006/0208196 A1 | 9/2006 | Tumer | |
| 2010/0219863 A1 | 9/2010 | Tumer | |

FOREIGN PATENT DOCUMENTS

| | | |
|---|---|---|
| DE | 3136343 A1 | 6/1982 |
| DE | 4226175 A1 | 6/1993 |
| DE | 19618465 C1 | 6/1997 |
| DE | 19644522 A1 | 5/1998 |
| DE | 10132550 A1 | 1/2003 |
| DE | 10132924 A1 | 1/2003 |
| DE | 102004060932 A1 | 6/2006 |
| DE | 102007029898 B3 | 8/2008 |
| WO | 9424583 A1 | 10/1994 |
| WO | 9800731 A1 | 1/1998 |

OTHER PUBLICATIONS

English abstract for DE 196 44 522 A1 dated May 7, 1998.
English abstract for DE 196 18 465 C1 dated Jun. 5, 1997.

* cited by examiner

*Primary Examiner* — Mark R Gaworecki
(74) *Attorney, Agent, or Firm* — Viering, Jentschura & Partner mbB

(57) ABSTRACT

In various embodiments, a gamma ray detector is provided. The gamma ray detector may include a converter element, configured to release an electron when a gamma ray moves at least partially through the converter element. The gamma ray detector may further include a semiconductor detector, arranged to receive the electron and configured to produce a signal when the electron moves at least partially through the semiconductor detector; and an amplifier circuit, coupled to the semiconductor detector and configured to amplify the signal produced by the semiconductor detector. In the gamma ray detector, the converter element may be arranged to at least partially shield the amplifier circuit from electromagnetic radiation.

17 Claims, 7 Drawing Sheets

FIG 4

| Angle [°] | W-sheets 50μm thick | counts |
|---|---|---|
| 0 | none | 3320 |
| 90 | none | 1880 |
| 0 | 2 x 50 μm | 2420 |
| 90 | 2 x 50 μm | 2760 |
| 0 | 4 x 50 μm | 1930 |
| 90 | 4 x 50 μm | 3020 |

Table 1

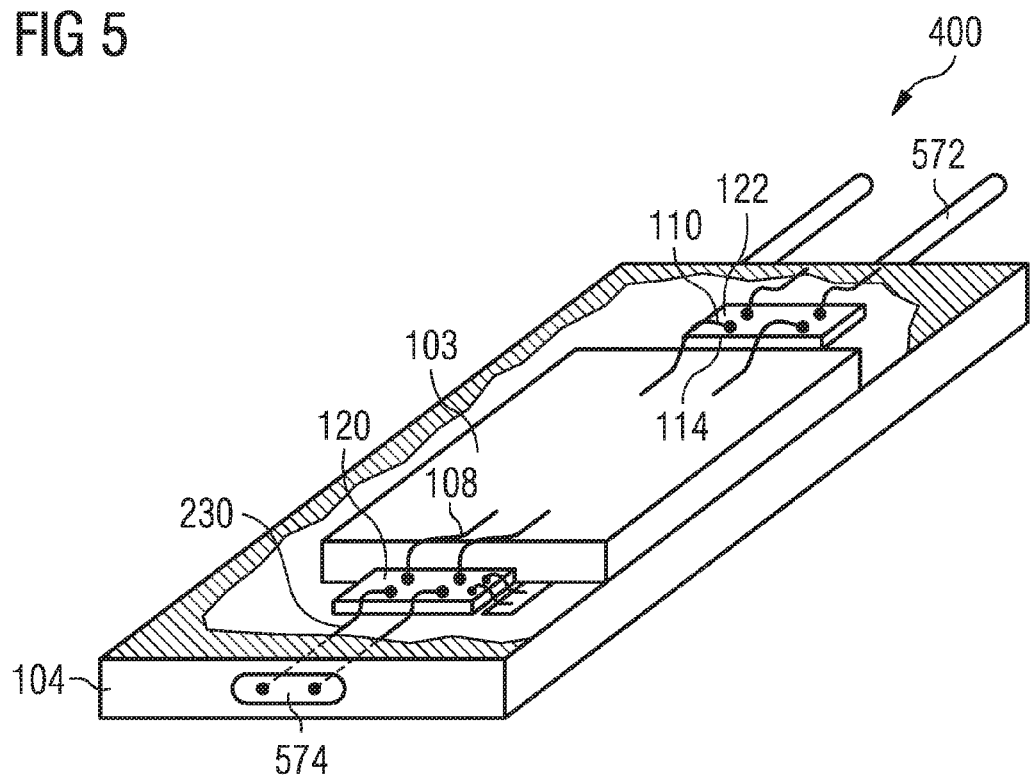

FIG 6

5010
providing a gamma ray detector, comprising a converter element, configured to release a fast electron when a gamma ray moves at least partially through the converter element; and a semiconductor detector, wherein the semiconductor detector comprises at least one p-doped region; at least one n-doped region; and at least one intermediate region, separating the at least one p-doped region from the at least one n-doped region, wherein the at least one intermediate region has a lower dopant concentration than the at least one p-doped region and the at least one n-doped region; at least one first electrode electrically contacting the at least one p-doped region; at least one second electrode electrically contacting the at least one n-doped region

5020
providing a supply voltage to the first electrode and a second supply voltage to the second electrode, wherein the second supply voltage is higher than the first supply voltage and wherein a voltage difference between the first and the second electrodes is below 5 V

5030
detecting a signal caused in the semiconductor detector when the fast electron moves at least partially through the semiconductor substrate

GAMMA RAY DETECTOR AND METHOD OF DETECTING GAMMA RAYS

TECHNICAL FIELD

Various embodiments relate generally to gamma ray detectors. In particular, various embodiments relate to semiconductor gamma ray detectors.

BACKGROUND

A person may encounter radioactive radiation (also referred to as nuclear radiation), for example artificial nuclear radiation emitted by nuclear power reactors or by systems, for example accelerators, or materials used for medical applications. Furthermore, natural radioactive radiation may occur in certain materials. The materials may undergo concentration processes that may lead to an elevation of their radiation levels. Nevertheless, such materials may be used in everyday products, for example in industry or construction, where they may be used without protective measures such as walls configured to shield from the radiation.

Furthermore, also someone who has no known contact with the described sources of radioactive radiation may nevertheless feel safer if he or she had a sensor for the radioactive radiation at his or her disposal.

As an application of nuclear radiation or systems emitting nuclear radiation and/or an awareness of the radiation increases, a requirement for portable sensors detecting such radioactive radiation may also increase. In order to enable a large number of the above described group of potential users to afford and use such a radiation sensor, a simple construction, small size, simple use and/or a low price may be desired. Such a radiation sensor may for example be configured to detect gamma radiation. Gamma radiation may also be referred to as gamma rays, gamma photons or gamma quanta. In the context of this application, the term "gamma radiation" (and its synonyms) may refer to electromagnetic radiation with a quantum energy above approximately 40 keV.

Usually, gamma radiation may be detected by means of a gaseous ionization detector, like for example a Geiger-Müller tube. Such gaseous ionization detectors may require a relatively large volume for a detection of gamma radiation, such that a miniaturization may be difficult.

Alternatively, traditional gamma ray detectors may use semiconductor materials for a direct detection of gamma photons. However, an interaction probability, i.e. the probability that a gamma photon will interact with the semiconductor material, for example by means of a photoelectric effect, Compton scattering or pair production, may be very low, at least compared to an interaction probability for charged particles, and also compared to electromagnetic radiation with a lower energy, for example electromagnetic radiation in a visible wavelength range. Silicon detectors may therefore primarily be used for a detection of a beta decay, which may lead to a release of an electron. Such a beta decay electron, being a charged particle, may have a detection probability of almost 100% in a silicon detector. The detection probability for a gamma photon, however, would be much lower in the silicon detector. In order to increase the detection probability for the gamma photons, a semiconductor with a higher atomic number may be used as the detector material. For example germanium (with an atomic number of 32, as opposed to 14 for the silicon) may be used. However, for an acceptable detection probability, a large volume of the germanium (or, more generally, the semiconductor) may still be required, which again makes a miniaturization difficult. Furthermore, germanium is very expensive.

SUMMARY

In various embodiments, a gamma ray detector is provided. The gamma ray detector may include a converter element, configured to release an electron when a gamma ray moves at least partially through the converter element. The gamma ray detector may further include a semiconductor detector, arranged to receive the electron and configured to produce a signal when the electron moves at least partially through the semiconductor detector; an amplifier circuit, coupled to the semiconductor detector and configured to amplify the signal produced by the semiconductor detector; and a shielding essentially completely surrounding the semiconductor detector and the amplifier circuit. In the gamma ray detector, the converter element may form at least part of the shielding.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 provides a table of experimental results obtained with a gamma ray detector according to various embodiments and a comparison gamma ray detector.

FIG. 5 shows a perspective view of a gamma ray detector in accordance with various embodiments; and FIG. 6 shows a method of forming a gamma ray detector in accordance with various embodiments.

DESCRIPTION

Figure 1A:
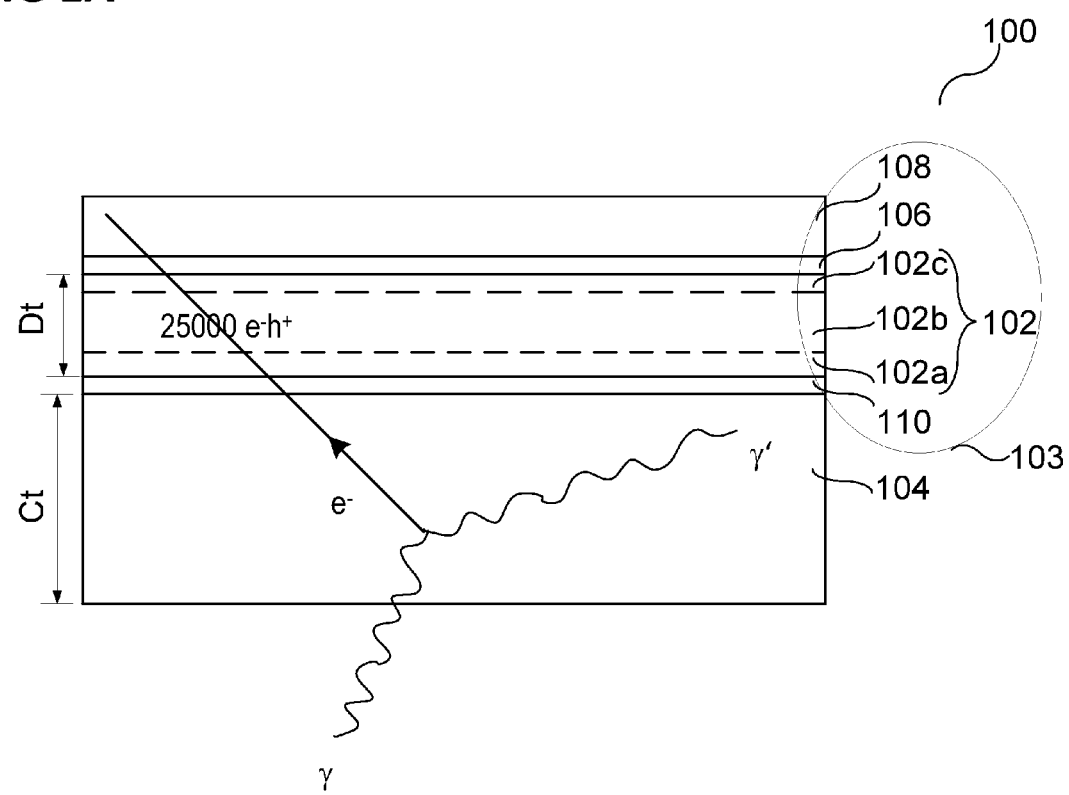
FIG. 1A and FIG. 1B show schematic cross sections of a gamma ray detector in accordance with various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The terms "heavy element" and "heavy metal" may be understood as referring to a chemical element with an atomic number larger than 20.

The terms "fast particle" and "fast electron" may be understood as referring to a particle/electron moving at a velocity corresponding to a kinetic energy of at least 20 keV, e.g. at least 100 keV, e.g. at least 511 keV, e.g. in a range from about 20 to about 10000 keV.

The terms "essentially completely surround" and "essentially completely enclose" may be understood as a first feature being formed around a second feature from as many directions as possible without compromising a functionality of the first feature, of the second feature and/or of a combination of the two features as a unit. For example, the second feature may be enclosed by the first feature, with an exception of an area where an access, for example a necessary access, may be provided, for example for electrically contacting the second feature, for allowing for pressure equalization between the enclosed space and an outside, and the like. The second feature may furthermore be understood as being essentially completely enclosed or surrounded by the first feature, if a fraction of a surface area of the second feature that is covered by the first feature is larger than or equal to about 90%, e.g. larger than or equal to about 95%, e.g. larger than or equal to about 99%, in other words, if at least about 90%, e.g. at least about 95%, e.g. at least about 99% of the total surface area of the second feature are covered by the first feature.

In various embodiments, a small gamma ray detector may be provided. The gamma ray detector may for example have a size with an area of less than 5 cm$^2$ and with a thickness of less than 5 mm, for example with an area of between 0.5 and 1.5 cm$^2$, and with a thickness of around 0.3 mm.

In various embodiments, the gamma ray detector may be produced at relatively low costs. For example, the gamma ray detector may work without using a large volume of an expensive semiconductor, such as germanium. Instead, the gamma ray detector may use a small volume of the semiconductor as a volume in which a detection signal is generated, and/or a less expensive semiconductor material, for example silicon, may be used.

In various embodiments, the gamma ray detector may be sensitive to a dose rate that may be considered potentially harmful to humans. The gamma ray detector may be sensitive to a dose rate from about 1 μSv/h. In other words, dose rates of greater than or equal to about 1 μSv/h may be detected.

In various embodiments, the gamma ray detector may be operated at an operation voltage of below approximately 5 V. For example, the operation voltage of the gamma ray detector may correspond to an operational voltage of a mobile communication device, for example a mobile phone. The gamma ray detector may for example be integrated into the mobile communication device, e.g. the mobile phone, and use its operation voltage as the operation voltage. An output of a detected signal may in various embodiments be provided by means of a data line operating at a low voltage.

In various embodiments, the gamma ray detector may include a converter element. In the converter element, incident gamma radiation may undergo Compton scattering, which may lead to a release of a Compton electron. The Compton electron, which may be fast or even relativistic (wherein a relativistic particle, e.g. an electron, may be understood as referring to a particle/electron with a kinetic energy that is at least as high as its own rest energy), may enter the semiconductor volume. There, the Compton electron may generate electron-hole-pairs, which may separate in an electric field formed in the semiconductor. This may cause a change in potential that may be detected as a signal.

A majority of the gamma radiation to be detected may be expected to have an energy of up to a few MeV (for example, caesium-137, which may contaminate ground, sea, animals, mushrooms, plants and food after an accident of a nuclear power plant, may emit gamma radiation with an energy of 608 keV). For these energies, a dominant interaction process with matter, e.g. with the converter element, may be the Compton scattering. However, a production of electron-positron-pairs (so-called pair production) may also play a role and may lead to an electron, e.g. a fast, e.g. a relativistic electron, entering the semiconductor volume, essentially just like the Compton electron. Unless noted otherwise, when in the following processes caused in the semiconductor volume by a Compton electron/fast/relativistic electron are described, the so-called Compton electron/fast/relativistic electron may also have its origin in a pair production process.

Thus, the gamma ray detector in accordance with various embodiments may not need to rely on the gamma rays interacting directly with the semiconductor (which may have a very low probability) for producing a detection signal. Instead (or additionally), the gamma rays may interact with the converter element, which may be chosen to have a higher interaction probability with the gamma radiation than the semiconductor, and the Compton electron, if it is scattered to enter the semiconductor, may generate the electron-hole-pairs that may cause the detection signal. A single fast, e.g. relativistic, particle may generate a lot of electron-hole-pairs in a semiconductor. By way of example, in a silicon chip with a thickness of about 280 μm, between 20,000 and 30,000 electron-hole-pairs may be generated. A detection probability for the fast, e.g. relativistic, particle by means of the generated electron-hole-pairs may be close to 100%.

In various embodiments, the converter element may include or consist of a material with a small absorption length for gamma radiation, for example a material with a high atomic number, for example a heavy metal (with an atomic number above 20), for example a material with an atomic number above 30, for example above 40, for example above 50, for example above 60, for example above 70, for example lead, tungsten or gold.

In various embodiments, the conversion element may be bonded to the semiconductor, for example to the semiconductor chip, for example to the silicon chip. The conversion element may be formed as a layer that may be bonded to the semiconductor.

In various embodiments, the gamma ray detector may detect gamma radiation essentially independent of an orientation of the gamma ray detector with respect to a source of the gamma radiation. In other words, a gamma ray detection signal provided by the gamma ray detector may essentially remain constant when a relative orientation of the gamma ray detector and the gamma ray source changes.

In various embodiments, it may be necessary to amplify the detection signal, for example by means of at least one amplifier. The at least one amplifier may for example be arranged as an amplifier circuit. The amplifier circuit may need to be shielded from electromagnetic radiation in order to work properly. In various embodiments, the amplifier circuit may be formed or arranged at a position where it may be at least partially shielded from electromagnetic radiation by means of the converter element. In this way, a high signal quality may be obtained despite a small size of the gamma ray detector.

In various embodiments, the amplifier circuit may be formed on a chip on which also the gamma ray detector is formed, thereby forming an integrated detector-amplifier-chip, and the chip may be arranged next to the converter element. For example, the chip may be bonded to the converter element, or the chip may be sandwiched between two parts of the converter element. In various embodiments, the amplifier circuit and the gamma ray detector may be formed separately and be coupled, for example be coupled electrically conductively. The gamma ray detector and the amplifier circuit may both be arranged next to the converter element, for example the detector may be bonded to the converter element and the amplifier circuit may be arranged on the converter element. The gamma ray detector and the amplifier circuit may for example be sandwiched between two parts of the converter element. The gamma ray detector and the amplifier circuit, irrespective of whether they are formed separately or in an integrated fashion, may in various embodiments be essentially completely enclosed in or be essentially completely surrounded by the converter element, for example the converter element may be formed around the gamma ray detector and the amplifier circuit in such a way that it only leaves openings for parts that need to lead in and/or out of a cavity formed by the converter element, for example feed-throughs for at least one power line and/or at least one data line.

In various embodiments, additional processing of the (amplified) detection signal may be provided, for example the signal may be cleaned and/or reshaped. By way of example, at least one signal processor may be used for processing the detection signal, e.g. a so-called "shaper", which may use a combination of integration and differentiation for re-shaping the detection signal.

Figure 1B:
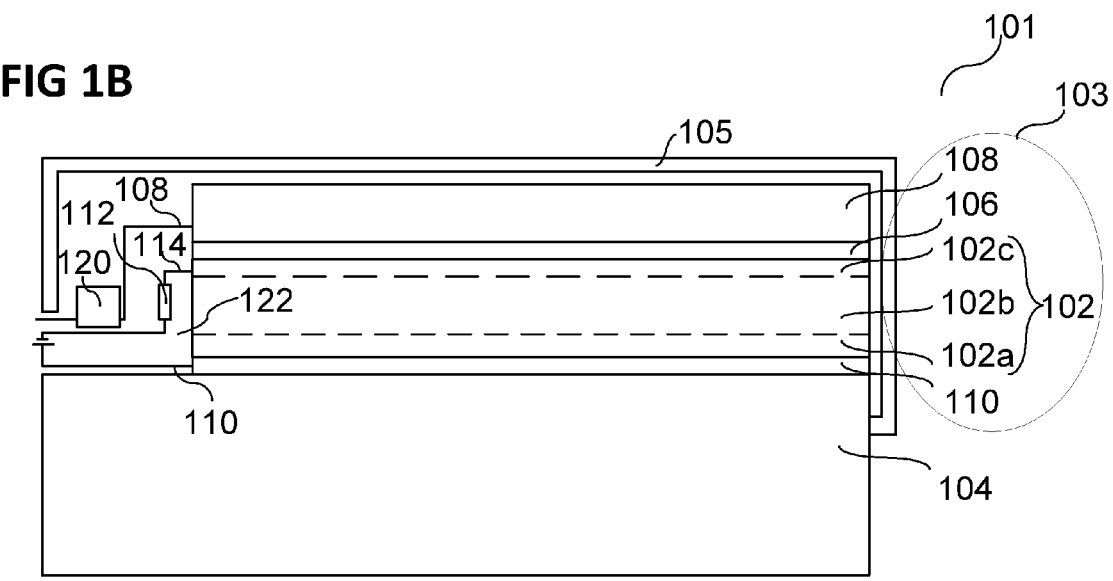

FIG. 1A and FIG. 1B show schematic cross sections of gamma ray detectors 100, 101 in accordance with various embodiments.

Gamma radiation may occur naturally in dose rates that may be considered as not being harmful to humans. However, nuclear power plants, nuclear medical treatment, concentration processes of natural substances etc. may lead to an elevated level of gamma radiation that may be harmful to humans. A low-price detector for detecting gamma radiation at least when its level is elevated such that it may be considered harmful for humans may be desired.

A number of gamma photons γ that may correspond to a given dose rate (in other words, a magnitude of a gamma photon flux as a function of dose rate), may be estimated. For an estimate, a dose rate of 20 µSv/h may be used, which may be considered harmful at least for long-term exposure.

A photon entering a body (for this purpose, it may be considered a meat-like substance) may be absorbed within a cubic decimeter (which may correspond to 1 kg of the meat-like substance) with a probability of 25%. An energy that the photon may lose in the body (per cm²) may be Fluxfactor=area×$q_0$×Eγ(keV)×$p_{abs}$, wherein area may be 100, corresponding to the 100 cm² of a cube with a weight of 1 kg; $q_0$ may be the elementary charge; Eγ may for example be 4000 keV; and $p_{abs}$ may be the absorption probability, assumed here to be 0.25. This may result in Fluxfactor=1.6×10$^{-11}$ J.

Assuming a dose rate of $I_0$=20 µSv/h, this may result in a flux of Flux (4 MeV)=$I_0$/3600/1.0×10$^6$/Fluxfactor=350 photons/cm²/sec and in a flux of Flux (511 keV)=2740 photons/cm²/sec for gamma photons resulting from annihilation. The flux of annihilation gamma photons may in reality be lower, because more than the assumed 25% may be absorbed in 1 kg of the meat-like substance, hence the assumed dose rate of 20 µSv/h may correspond to similar numbers of gamma photons, no matter whether the gamma photons are assumed to have an energy of 4 MeV or of 511 keV. The number of gamma photons corresponding to a dose rate of 20 µSv/h may be around several 100 photons/cm²/sec.

As shown in FIG. 1A, a gamma photon γ may compton scatter in a converter element 104. This may result in a compton-scattered photon γ', which may have a lower energy than the gamma photon γ, and a compton scattered electron e$^-$.

As shown in FIG. 1A and FIG. 1B, in various embodiments, a gamma ray detector 100 may include a semiconductor detector 103, the converter element 104 that may form part of a shielding 104, 105, and an amplifier circuit 120.

In various embodiments, the semiconductor detector 103 may include a semiconductor volume 102 (also referred to as semiconductor bulk). The semiconductor volume 102 may include or essentially consist of a semiconductor material. The semiconductor material may for example include or be at least one of silicon, germanium, a III-V compound semiconductor, a II-VI compound semiconductor, or a IV-IV compound semiconductor, e.g. silicon germanium, silicon carbide, cadmium telluride, gallium arsenide, indium phosphide or mercury(II) iodide.

In various embodiments, the semiconductor detector 103, i.e. the semiconductor volume 102, may include at least one p-doped region 102c, at least one n-doped region 102a and at least one intermediate region 102b, separating the at least one p-doped region 102c from the at least one n-doped region 102a. The at least one intermediate region 102b may have a lower dopant concentration than the at least one p-doped region 102c and the at least one n-doped region 102a. In various embodiments, the semiconductor volume 102 may be arranged as shown, with the n-doped region 102a closer to the converter element 104 than the p-doped region 102c. In various embodiments, however, the semiconductor volume 102 may be arranged with the p-doped region 102c closer to the converter element 104, or with both, the p-doped region 102c and the n-doped region 102a, close to the converter element 104.

The semiconductor detector 103 may, in various embodiments, be arranged to be as close as possible to the converter element 104. A distance between the semiconductor detector 103 and the converter element 104 may for example be smaller than 1 mm, e.g. smaller than 100 µm, e.g. smaller than 10 µm.

In various embodiments, the semiconductor detector 103 may be in contact with the converter element 104, e.g. in physical contact, e.g. in direct physical contact.

In various embodiments, the at least one n-doped region 102a may be an n$^+$-doped region, in other words a highly doped n-type region, for example a region with a concentration of dopant atoms above approximately 10$^{16}$ cm$^{-3}$, for example above approximately 10$^{17}$ cm$^{-3}$. The dopant may be a donor with respect to the material of the semiconductor detector 103. For example, for a group IV semiconductor, the dopant may be group V atoms, for example antimony, phosphorus and/or arsenic.

The at least one n-doped region 102a may have a thickness in a range from about 50 nm to about 10 μm, for example from about 500 nm to about 2 μm.

In various embodiments, the at least one p-doped region 102c may be a p⁺-doped region, in other words a highly doped p-type region, for example a region with a concentration of dopant atoms above approximately $10^{16}$ cm$^{-3}$, for example above approximately $10^{17}$ cm$^{-3}$. The dopant may be an acceptor with respect to the material of the semiconductor detector 103. For example, for a group IV semiconductor, the acceptor may for example be group III atoms, for example be boron, aluminum and/or gallium.

The at least one p-doped region 102a may have a thickness in a range from about 50 nm to about 10 μm, for example from about 500 nm to about 2 μm.

In various embodiments, the at least one intermediate region 102b may be an n-doped region, for example an n⁻-doped region, in other words a lightly doped n-type region. In various embodiments, the at least one intermediate region 102b may be a p-doped region, for example a p⁻-doped region, in other words a lightly doped p-type region. A concentration of dopant atoms for the light doping may be approximately $10^{16}$ cm$^{-3}$ or lower. In various embodiments, the intermediate region 102b may not be doped. In other words, the intermediate region 102b may be a so-called intrinsic semiconductor.

In various embodiments, a thickness Dt of the semiconductor volume 102 may be a thickness of a typical semiconductor wafer. In various embodiments, the thickness Dt of the semiconductor volume 102 may be smaller than the thickness of a typical semiconductor wafer, for example if the wafer is thinned. The thickness Dt of the semiconductor volume 102 may be in a range from about 100 μm to about 1000 μm, for example around 275 μm, around 375 μm, around 525 μm, around 625 μm, around 675 μm, around 725 μm, around 775 μm or around 925 μm.

In various embodiments, two main sides (with two corresponding main surfaces) of the semiconductor volume 102 may extend at right angles to the thickness direction of the semiconductor volume 102.

In various embodiments, as shown in FIG. 1A and FIG. 1B, the p-doped region 102c, the intermediate region 102b and the n-doped region 102a may have a layered structure. In other words, the p-doped region 102c may extend along one main surface of the semiconductor volume 102, and the n-doped region 102a may extend along the opposite main surface of the semiconductor volume 102. Other configurations of the semiconductor volume 102 are shown in FIG. 3A to FIG. 3D and are described in the corresponding parts of the description.

In various embodiments, the semiconductor detector 100, 101 may include at least one first electrode 114 electrically contacting the at least one p-doped region (not shown in FIG. 1A, but see for example FIG. 1B). The first electrode 114 may be electrically connected to a power supply 122.

In various embodiments, the semiconductor detector 100, 101 may include at least one second electrode 110 electrically contacting the at least one n-doped region 102a (not shown in FIG. 1A, but see for example FIG. 1B). The second electrode 110 may be electrically connected to the power supply 122.

In various embodiments, the first electrode 114 and the second electrode 110 may be electrically connected to the power supply 122 in such a way that the semiconductor detector 100 is biased in reverse direction. For example, the voltage supplied to the n-doped region 102a by means of the second electrode 110, also referred to as the second supply voltage, may be higher than the voltage supplied to the p-doped region 102c by means of the first electrode 114, also referred to as the first supply voltage. By way of example, the p-doped region 102c may be connected to ground by means of the first electrode 114. In various embodiments, a voltage difference between the second supply voltage and the first supply voltage may be below 50 V, e.g. below 5 V. In various embodiments, for example if the gamma ray detector 100, 101 is part of a mobile device, e.g. a mobile phone, the power supply 122 may be the power supply of the mobile device. In other words, the voltage difference between the second supply voltage and the first supply voltage may correspond to a driving voltage of the mobile device, i.e. to a voltage difference supplied to electronic parts of the mobile device by the power supply of the mobile device, e.g. by its battery or accumulator. For example, at present a driving voltage of 3.8 V is often used in mobile phones, and the driving voltage of 3.8 V could also be used for driving the gamma ray detector.

In various embodiments, the semiconductor detector 103 may be arranged to receive the Compton scattered electron, which may be a fast, e.g. relativistic electron e⁻. The fast electron e⁻ may be released from the converter element 104. The semiconductor detector 103 may be arranged in such a way that a large percentage of fast, e.g. relativistic electrons e⁻ released from the converter element 104 may be received by the semiconductor detector 103, for example within the semiconductor volume 102 of the semiconductor detector 103. For example, the converter element 104 may be arranged along one or both of the main sides of the semiconductor volume 102, e.g. in a symmetric arrangement, or the converter element 104 may surround the semiconductor detector 103 essentially completely.

In various embodiments, the semiconductor detector 103 may be shielded from electromagnetic radiation, e.g. from light in a visual wavelength range. Thereby, a formation of a signal in the semiconductor detector 103 by electromagnetic radiation that is not supposed to be detected may be avoided. Furthermore, the amplifier circuit 120 may be shielded from electromagnetic radiation with a wavelength below the gamma radiation. Thereby, a formation of an undesired signal, for example a noise signal, for example a noise signal introduced by radiation at radio frequencies, in the amplifier circuit 120 may be avoided or alleviated.

In various embodiments, the shielding may be achieved by means of a shielding 104, 105, wherein at least part of the shielding 104, 105 may be formed by the converter element 104. A part 105 of the shielding 104, 105 not formed by the converter element 104 may be formed by a layer 105 including or consisting of a metal, e.g. copper or aluminum. The layer 105 may have a thickness in a range from about 0.05 mm to about 1 mm, e.g. around 0.5 mm. The shielding 104, 105 may essentially completely surround the semiconductor detector 103 and the amplifier circuit 120. In other words, the shielding may completely enclose the semiconductor detector 103 and the amplifier circuit 120, with an exception of an opening that may be large enough to permit a necessary access to the amplifier circuit 120 and/or the semiconductor detector 103, e.g. for having power lines 110, 114 and/or at least one data line 108 pass through the shielding 104, 105.

The semiconductor detector 103 may further be configured to produce a signal when the fast electron e⁻ moves at least partially through the semiconductor detector 103. Such a process in which the (partial) passage of one electron causes a corresponding signal to be formed may also be referred to as an event.

A number of events that may be expected for a dose rate of 20 µSv/h and for the corresponding number of photons estimated above may be estimated as follows: Firstly, care may be taken to select a thickness of the converter element 104 that may allow the Compton scattered electrons to escape from the converter element 104. For example, a converter element 104 consisting of a heavy element with a thickness of more than 1 mm may be too thick, because the Compton electrons may get stuck in the converter element 104. A formula for estimating an average distance that a beta decay electron may travel in a material and which may also be used for estimating a maximum distance $R_{max}$ that a Compton electron with a maximum energy $E_{max}$ may travel in a medium with a density ρ is $R_{max}=E_{max}/2/\rho$, wherein E may be in MeV and ρ may be in g/cm³. This leads to a maximum thickness of the converter element 104 of $R_{max}=1.8$ mm for gamma photons with an energy of 4 MeV if lead is used. A layer of lead with a thickness of about 1 mm may therefore be used as the converter element 104.

Secondly, using the assumption that the converter element 104 is a layer of lead with a thickness of Ct=1 mm and that the number of photons corresponds to the photon flux estimated above, it may be estimated how many photons may be converted to electrons in the converter element 104, for example by means of Compton scattering or by means of pair production.

An absorption coefficient µ for lead and gamma photons with an energy of 4 MeV may be µ≈0.7/cm. A flux of gamma photons $I_{pass}$ passing through the converter element 104 with the thickness of Ct=1 mm without being absorbed may be $I_{pass}=I_0 \times e^{-\mu \, Ct}=0.93 \times I_0$, wherein $I_0$ may be the flux of gamma photons entering the converter element 104. Consequently, $I_0-I_{pass}=0.068 \times I_0$, which corresponds to 6.8% of the 4 MeV photons, may be absorbed in the converter element 104. If the flux instead consists of photons with an energy of 511 keV, more of the photons may get absorbed in the converter element 104, but the maximum thickness $R_{max}$ calculated above for 4 MeV photons may also be smaller for photons with a lower energy, which means that more of the generated electrons may get stuck in the converter element 104 (in other words, fewer photons may escape from the converter element). As a consequence, the number of fast, e.g. relativistic electrons being generated in the converter element 104 and entering the silicon detector may be similar for photons with an energy of 4 MeV and photons with an energy of 511 keV.

Taking into account a solid angle in which the electrons may enter the silicon detector 103, which may result in a factor of 0.25, a number of events (also referred to as counts) N≈350 photons/cm²/sec×0.068×0.25=6 counts/sec may be expected for the dose rate of 20 µSv/h.

The fast, e.g. relativistic electron e⁻ may enter the semiconductor volume 102 with a high velocity. For example, the electron velocity may not be negligible with respect to the speed of light. Consequently, the electron may have a high kinetic energy. During its passage or partial passage through the semiconductor volume, at least a fraction of the kinetic energy of the fast, e.g. relativistic electron may be used for a production of electron-hole-pairs. In other words, the fast electron, by means of its at least partial passage through the semiconductor volume 102, may generate charge carriers (negatively charged electrons and positively charged holes). For example, about twenty- to thirty thousand electron-hole-pairs may be generated if the semiconductor volume 102 has a thickness of about 275 µm or about 280 µm. The charge carriers may be free to separate from each other, for example essentially immediately after their creation, and to move in the semiconductor volume 102 by means of an electric field that may be generated in the semiconductor volume 102 (and which may, but does not have to, essentially extend through the whole semiconductor volume) by means of the first voltage and the second voltage being supplied to the first electrode 114 and to the second electrode 110, respectively. The electrons may drift towards a positive potential and the holes may drift towards a negative potential. For example, the electrons may drift towards the second electrode 110 to which the higher voltage may be supplied, and the holes may drift towards the first electrode 114 to which the lower voltage may be supplied. For example, the holes may eventually recombine with electrons provided by the ground contact.

In various embodiments, the semiconductor detector 103 may further include a resistor 112 that may be coupled between the first electrode 114 and the power supply 122, e.g. ground. The resistor 112 may have a high resistance, for example a resistance in a range from about 1 MΩ to about 1 GΩ, e.g. from about 10 MΩ to about 100 MΩ.

The recombination of the holes that may have been generated by the fast, e.g. relativistic electron passing through the semiconductor volume 102 may be delayed by the resistor 112 with the high resistance. In other words, the charges generated in the semiconductor volume that may drift towards the first electrode may have time to accumulate at or in the first electrode 114.

In various embodiments, the p-doped region 102c may be separated from a data line 108 by means of a dielectric 106, for example a dielectric 106 formed as a layer. The dielectric 106 may for example be deposited, for example by means of chemical vapor deposition (CVD). Alternatively or additionally, the dielectric may for example be formed by an oxidization process, for example by means of a silicon oxidation process, for example locally by means of a so-called LOCOS-process (short for "local oxidation of silicon"). The dielectric 106 may be formed on or over the semiconductor volume 102, for example over the p-doped region 102c. The dielectric 106 may, in various embodiments, include or consist essentially of a dielectric material. The dielectric 106 may for example include or consist essentially of at least one of an oxide, for example silicon dioxide, titanium dioxide or alumina and a nitride, for example silicon nitride.

In various embodiments, the dielectric 106 may have a thickness in a range from about 50 nm to about 500 nm, for example from about 100 nm to about 300 nm, for example around 200 nm.

In various embodiments, the data line 108 may be formed on or over the dielectric 106. It may for example be formed by means of deposition. In various embodiments, the data line 108 may be structured, for example during and/or after the forming of the data line 108. The data line 108 may be made of an electrically conductive material. It may for example include, essentially consist of or consist of at least one metal, for example aluminum and/or copper. The data line 108 may have a thickness in a range from about 100 nm to about 2 µm.

The p-doped region 102c, the dielectric 106 and the data line 108 may be considered as forming a capacitor. The charge accumulating in one half of the capacitor—the p-doped region 102c—may be detected by means of a second half of the capacitor—the data line 108—and may be provided as the detection signal by the data line 108. In other words, the charges accumulating at or near the p-doped region 102c may cause a voltage shift in the data line 108 that may be registered as the detection signal. The detection signal provided by the data line 108 may be amplified by means of the amplifier circuit 120.

In other words, a gamma ray may cause a release of the fast, e.g. relativistic electron e⁻, which may enter the semiconductor volume 102, causing electron-hole-pairs to form, the holes of which drift towards the p-doped region 102c connected to the negative first electrode 114, and the electrons of which drift towards the n-doped region 102a, connected to the positive second electrode 110. The data line 108, which may be capacitively coupled to the p-doped region 102c, may register the accumulation of holes in and/or near the p-doped region 102c as the detection signal, which may be amplified by means of the amplifier circuit 120.

A capacitance of the dielectric 106 and the resistance of the resistor 112 may determine a relaxation time (the term "relaxation time" may be understood to mean a time that the detector, after an event occurred, requires to re-assume a state it was in before the event). The relaxation time of the gamma ray detector 100, 101 may be smaller than an inverse of an expected frequency of events, i.e. smaller than an inverse of the frequency with which the gamma rays are expected to cause a detection signal in the gamma ray detector 100, 101. In other words, the relaxation time of the gamma ray detector 100, 101 may be smaller than an expected average time between two consecutive events to be detected. In various embodiments, the relaxation time of the gamma ray detector 100, 101 may be an upper limit of a dose rate of gamma radiation that may be detected. If the dose rate is high enough to cause events with a time separation that is shorter than the relaxation time of the gamma ray detector 100, 101, the gamma ray detector 100, 101 may not be able to count essentially all of the events, in other words, the gamma ray detector 100, 101 may be saturated at a maximum event rate, which may also be referred to as a maximum count rate, since an event may during processing be converted to a count. The maximum event rate may correspond to a maximum detectable dose rate and may be determined by the relaxation time of the gamma ray detector 100, 101.

In various embodiments, the gamma ray detector 100, 101 may have an active range in which a relation of the number of gamma photons to be detected to the number of counts counted by the gamma ray detector 100, 101 may be strictly monotonic. The relation may for example be linear, in other words, a range in which the number of gamma photons to be counted (e.g. defined by an actual dose rate) and the number of counts (e.g. the detected dose rate) correlate approximately linearly.

In various embodiments, the amplifier circuit 120 may be coupled to the semiconductor detector 103. The amplifier circuit 120 may be electrically, for example electrically conductively, coupled to the semiconductor detector 103. The amplifier circuit 120 may be configured to amplify the signal produced by the semiconductor detector, also referred to as the detection signal or simply the signal. The amplifier circuit 120 may include at least one amplifier.

In various embodiments, the detection signal may be processed, for example before or after the amplification by means of the amplifier circuit 120. The detection signal may for example be re-shaped by means of a shaper, it may be converted to a number of counts and/or to a count rate (i.e. the number of counts per unit of time).

In various embodiments, the gamma ray detector 100, 101 may be configured to provide just an integrated signal, e.g. a number of counts or a count rate, as opposed to a spatially and/or spectrally resolved signal. This may be useful in an application where just a total exposure to gamma radiation is of interest, and not a location of a source of gamma radiation and/or an energy spectrum of the detected gamma radiation. Detecting the signal in a spatially and/or spectrally unresolved fashion may for example allow for a simpler design of the gamma ray detector 100, 101, for a better signal quality and/or for a low driving voltage of the gamma ray detector 100, 101.

If a spatially resolved signal was to be produced, a high time resolution of the signal would possibly be required for correlating the signal with a direction of origin, for example the charges generated by the fast electron passing through the semiconductor volume 102 may need to be formed and separated within a few nanoseconds. This might require the intermediate region 102b to be completely depleted, which in turn might require a high voltage, for example a voltage of more than 100 V, for example 200 V, to be applied to the semiconductor detector 103.

Because of choosing not to provide a spatially resolved signal, a low time resolution of the signal may be sufficient. For example, it may be sufficient if the charges are generated and separated within 1 to 10 μsec. This may mean that the intermediate region 102b may not need to be completely depleted. Instead, it may be sufficient to form a thin depletion zone around the first electrode 114. Such a depletion zone that may not extend through the whole intermediate region 102b may be achieved with a relatively low voltage. In various embodiments, a voltage difference between the second supply voltage and the first supply voltage of below 50 V may be sufficient, for example below 40 V, for example below 30 V, for example below 20 V, for example below 10 V, for example below 5 V, for example a driving voltage of a mobile communication device, for example around 3.8 V.

In various embodiments, the semiconductor detector 103 may be formed on, for example directly or indirectly on, the converter element 104.

In various embodiments, the converter element 104 may include or essentially consist of a material with a small absorption length for gamma radiation. The absorption length for gamma radiation may decrease with increasing atomic number. In other words, a material with a higher atomic number may be more likely to interact with a gamma photon than a material with a lower atomic number.

In various embodiments, the converter element 104 may include or essentially consist of a heavy element (also referred to as a heavy metal) or an oxide of a heavy element. The converter element 104 may essentially be formed from the heavy element. The heavy metal of the converter element 104 may have an atomic number above 20, for example an atomic number above 30, for example above 40, for example above 50, for example above 60, for example above 70. The heavy metal of the converter element 104 may for example be lead, tungsten or gold. The heavy element of the converter element 104 may have an atomic number that is at least higher than the atomic number of the semiconductor detector 103. In this way, an interaction probability for a gamma photon γ entering the gamma ray detector 100, 101 may be higher for the converter element 104 than for the semiconductor volume 102.

In various embodiments, the converter element 104 may be sheet-like. In other words, the converter element may extend in two directions at a right angle to a thickness direction and to each other much more than in the thickness direction. Sides orthogonal to the thickness may also be referred to as main sides, and corresponding surfaces as main surfaces. A thickness Ct of the converter element 104 may be in a range from about 0.05 mm to about 0.5 mm, for example around 0.1 mm.

In various embodiments, the converter element 104 may be arranged with one of its main sides along one of the main sides of the semiconductor volume 102. The converter element 104 may for example be arranged to extend with its main side or sides essentially parallel to the main sides of the semiconductor volume 102. As shown in FIG. 1B, the converter element 104 may be larger (orthogonal to its thickness) than the semiconductor volume 102. The semiconductor detector 103 may be arranged on the converter element 104. By way of example, the semiconductor detector 103 may be fixed on the converter element 104. The semiconductor detector 103 may for example be soldered or glued to the converter element 104. In a region of the converter element 104 left uncovered by the semiconductor detector 103, the amplifier circuit 120 may be arranged. The amplifier circuit 120 may for example be arranged on the same side of the converter element 104 as the semiconductor detector 103. The amplifier circuit 120 may be fixed on the converter element 104. The amplifier circuit 120 may for example be soldered or glued to the converter element 104. In various embodiments, the converter element 104 may extend along the semiconductor detector 103 and along the amplifier circuit 120.

In various embodiments, the amplifier circuit 120 may be shielded by the converter element 104 from undesired electromagnetic radiation, at least partially if the converter element 104 is not arranged essentially completely surrounding the amplifier circuit, for example like in FIG. 1B, where the converter element 104 may be formed on only one side of the amplifier circuit 120. The amplifier circuit 120 may be coupled, e.g. electrically connected, e.g. electrically conductively connected to a data line 108. The data line 108 may be configured to receive a detection signal generated by the semiconductor detector 103 and to transmit the detection signal to the amplifier circuit 120. The amplifier circuit 120 may be configured to amplify the detection signal supplied by the data line 108. By means of shielding the amplifier circuit 120 (at least partially) from electromagnetic radiation, a creation of noise (the term "noise" may be understood as a signal, which here may be induced in the data line 108 and/or in the amplifier 120, that is unrelated to an event to be detected) in the data line 108 and/or in the amplifier circuit 120 may be alleviated or avoided. Consequently, an amplification of the noise by means of the amplifier circuit 120 may also be alleviated or avoided.

In various embodiments, as shown in FIG. 1A and FIG. 1B, the converter element 104 may extend essentially in parallel to the main surfaces of the semiconductor volume 102 on one side of the semiconductor volume 102. Other shapes and configurations of the converter element 104 and of its arrangement with respect to the semiconductor volume 102 and/or with respect to the p-doped region 102c, the n-doped region 102a and the intermediate region 102b may be shown in FIG. 3A to FIG. 3D and the corresponding parts of the description.

Figure 2A:
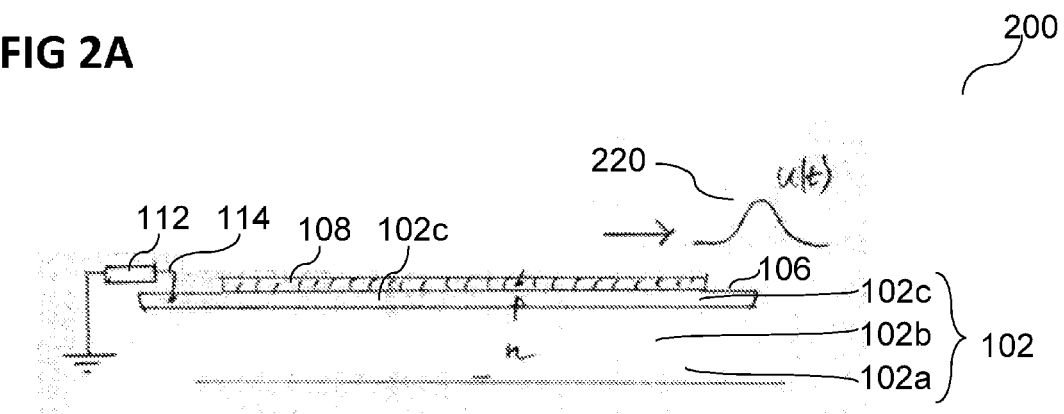
FIG. 2A shows a schematic cross section of a semiconductor detector of a gamma ray detector in accordance with various embodiments.

FIG. 2A shows a schematic cross section of a semiconductor detector 200 of a gamma ray detector in accordance with various embodiments. Like the semiconductor detector 103 shown in FIG. 1A and FIG. 1B, the semiconductor detector 200 may have a second electrode, which is not shown. The semiconductor detector 200 may essentially correspond to the semiconductor detector 103 of FIG. 1A and FIG. 1B, and a repetition of a description of identical or similar parts is omitted. The semiconductor detector 200 may be part of a gamma ray detector 100, 101 as shown in FIG. 1A and/or FIG. 1B. In FIG. 2A, the dielectric 106 is not shown as a separate structure, for example an individual layer. Instead, the dielectric 106 is indicated only as a surface of the semiconductor volume 102 (of the p-doped region 102c), since the dielectric 106 may be formed there as a thin structure, for example a thin layer, for example a thin structure including an oxide or a nitride.

A signal 220 formed in the data line 108, for example a signal as described in the context with FIG. 1A and FIG. 1B, may be a voltage U that varies over time t, as is indicated schematically in FIG. 2A by a curved signal U(t), 220. The signal 220, e.g. the voltage U(t), may have its maximum amplitude at or near a middle of the signal 220. The signal 220, e.g. the voltage U(t), may be considered a voltage pulse. The signal 220, e.g. the voltage U(t), may be an absolute voltage. The signal 220, e.g. the voltage U(t), may be a voltage measured relative to a basic voltage of the data line 108, in other words, it may be a voltage change with respect to the basic voltage of the data line 108. The signal 220, e.g. the voltage U(t), may be a positive or a negative voltage.

Figure 2B:
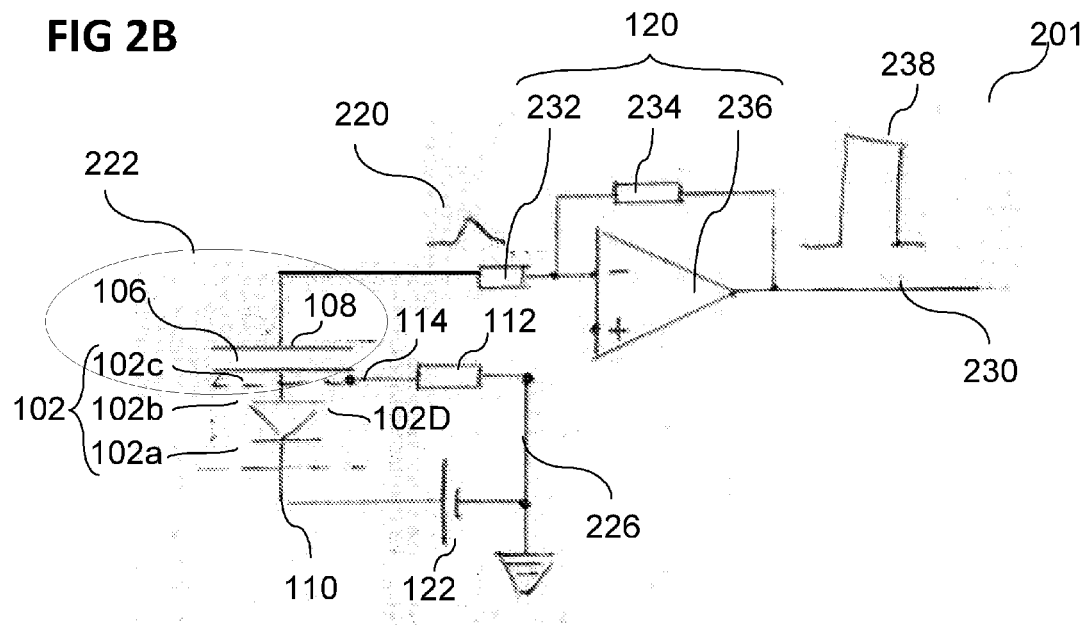
FIG. 2B shows an equivalent circuit diagram for a gamma ray detector in accordance with various embodiments.

FIG. 2B shows an equivalent circuit diagram for a gamma ray detector 201 in accordance with various embodiments.

In the equivalent circuit diagram for the gamma ray detector 201, the semiconductor volume 102 may be represented as a diode 102D, with its cathode electrically connected to a pole of a power supply 122 with two poles. The cathode of the diode 102D may be connected to the pole of the power supply 122 with the higher voltage. The other pole may be connected to ground and/or to an anode of the diode 102D, for example by means of the resistor 112 and possibly by means of an electrical connection 226. The semiconductor volume 102 of the gamma ray detector 201 may thus be represented by the reversely biased diode 102D.

The p-doped region 102c of the semiconductor volume 102 may be considered as forming one electrode, of a capacitor 222, e.g. a plate of a plate capacitor 222, as shown in FIG. 2A, the data line 108 may be considered as forming a second electrode, e.g. plate, of the capacitor 222, and the dielectric 106 may be considered as forming the gap between the two electrodes of the capacitor 222. In a case where the dielectric 106 is formed by or includes an oxide, the capacitor 222 may be referred to as the oxide capacitor 222. Even if the capacitor 222 may be referred to as the oxide capacitor 222 for distinguishing it from another capacitor to be described next (which may be referred to as the semiconductor capacitor), a working principle of the gamma ray detector 201 may be valid, even if the dielectric 106 does not include an oxide.

The semiconductor 102, symbolized in FIG. 2B as the diode 102D, with its arrangement of the p-doped region 102c, the intermediate region 102b, which may at least partially be depleted of charge carriers and therefore may be regarded as a dielectric, and the n-doped region 102a, may be considered as forming the other capacitor (the semiconductor capacitor). The semiconductor may for example include silicon. In that case, the semiconductor capacitor may be referred to as the silicon capacitor. A separation of the electrodes (the p-doped region 102c and the n-doped region 102a) of the semiconductor capacitor may essentially be the thickness Dt (see FIG. 1A) of the semiconductor substrate 102, for example a wafer thickness.

A charged particle, for example the fast, e.g. relativistic electron, may pass through the semiconductor volume 102, which may include or consist of a crystal. The charged particle may not pass through the whole semiconductor volume 102 and leave it again. Rather, it may get stuck (in other words, be absorbed) in the semiconductor volume 102. However, any charged particle entering the semiconductor volume 102 may be considered as passing at least partially through the semiconductor volume 102. The charged particle may generate the charge carriers (e.g. the electron-hole-pairs) in the semiconductor volume 102 and cause equal amounts of charge at the electrodes of the semiconductor capacitor, e.g. of the silicon capacitor. This may cause an increase in voltage across the diode 102D, i.e. the semiconductor capacitor, e.g. the silicon capacitor. At a first moment, this voltage increase may be transferred to the capacitor 222, e.g. the oxide capacitor 222, until a charge equalization (on one side by means of the resistor 112 towards the power supply 122, on the other side by means of the data line 108 towards the amplifier circuit 120) may set in. A larger capacity of the capacitor 222, e.g. the oxide capacitor 222, means that more charge may be required to flow to achieve a charge equalization. This means that a signal processing of the charge may be facilitated.

The second electrode of the capacitor 222, i.e. the data line 108, may be electrically connected to the amplifier circuit 120. The signal 220 may be transferred to the amplifier circuit 120 by means of an electrically conductive connection. The amplifier circuit 120 may include at least one amplifier 236, for example at least one operational amplifier 236. The amplifier circuit 120 may include further active or passive electronic devices, e.g. resistors 232, 234 as shown in FIG. 2B. Each electronic device of the further electronic devices may be electrically conductively coupled to the amplifier 236, for example it may be coupled in series with the amplifier 236 or parallel to the amplifier 236. In various embodiments, the resistor 232 may correspond to a resistance, for example an ohmic resistance, of the data line 108, which may be very small.

In various embodiments, the amplifier circuit 120 may be configured to amplify the signal 220 provided by the semiconductor detector, e.g. by the data line 108 of the semiconductor detector. The amplifier circuit 120 may provide an amplified signal 238 of the signal 220, for example an amplified inverted signal 238. The amplifier circuit 120 may for example be configured as an inverting amplifier as shown in FIG. 2B. An amplification provided by the amplifier circuit 120 may be determined by the resistors 232 and 234. A non-inverting input of the amplifier 236, symbolized by "+", may be grounded, and an inverting input of the amplifier 236, symbolized by "−" may receive the signal 220. The signal 238 (the output signal) may be amplified by a factor determined by a ratio of the resistors 234 and 232, and the signal may be inverted. The amplifier circuit 120 may include not only the inverting amplifier shown. Alternatively or additionally, the amplifier circuit 120 may be or include at least one different amplifier or a different amplifier circuit, for example a non-inverting amplifier, or an additional inverting amplifier.

In various embodiments, the amplified signal 238 may be provided by means of an output line 230.

Figure 2C:
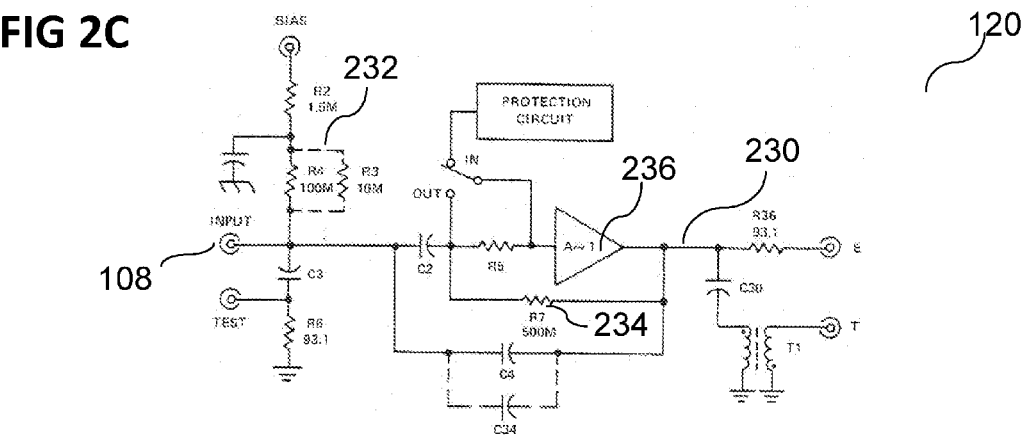
FIG. 2C shows an example for an amplifier circuit that may be used in a gamma ray detector in accordance with various embodiments.

FIG. 2C shows an example for an amplifier circuit 120 that may be used in a gamma ray detector in accordance with various embodiments for example in the gamma ray detector 300, 301, 302 or 303.

FIG. 3A to FIG. 3D show partial cross sectional diagrams of gamma ray detectors 300, 301, 302 and 303 in accordance with various embodiments.

Parts, regions, functionalities etc. of most or all elements of the gamma ray detectors 300, 301, 302 and/or 303 may correspond to those described in the context of FIG. 1A to FIG. 2B and may not be repeated here.

Figure 3A:
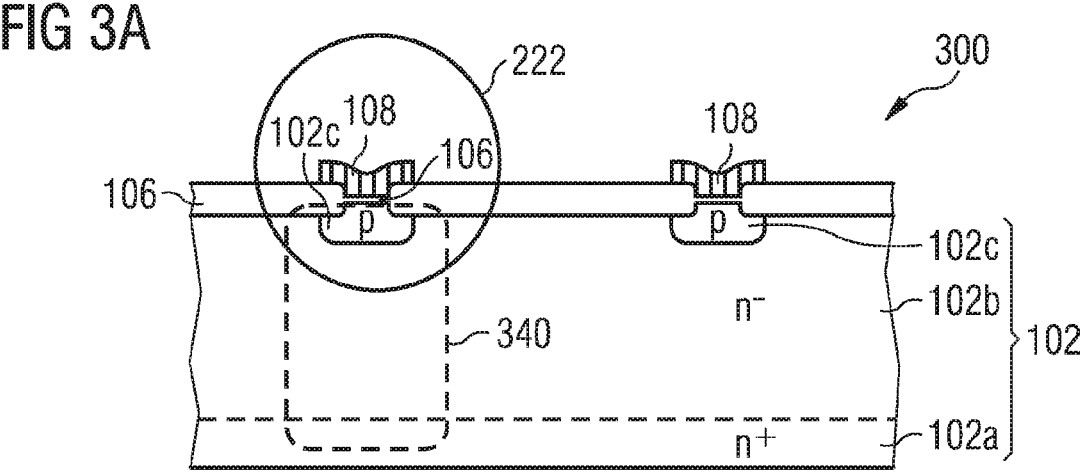
FIG. 3A to FIG. 3D show cross sectional diagrams of gamma ray detectors in accordance with various embodiments.

As shown in FIG. 3A, the gamma ray detector 300 may differ from the gamma ray detectors described in the context with FIG. 1A, FIG. 1B and FIG. 2A mainly by a shape of its p-doped region 102c and a shape of the data line 108, and possibly in the way that the signal 220 is treated.

In the gamma ray detector 300, the n-doped region 102a and the intermediate region 102b may essentially be formed as layered structures like in FIG. 1A, FIG. 1B and FIG. 2A.

In various embodiments, the p-doped region 102c may not be shaped as a layer, but rather as a plurality of individual p-doped regions 102c, for example a plurality of strips, bars, cuboids, or volume of any other shape of p-doped regions 102c (which may in the following be simply referred to as "bars" without limiting the shape of the individual p-doped regions 102c to that particular shape). The plurality of p-doped regions 102c is shown in FIG. 3A in cross section. The plurality of p-doped regions 102c may be formed in the intermediate region 102b of the semiconductor, for example by means of implantation and/or diffusion, for example using a photolithographic process followed by the implantation and/or diffusion. The plurality of p-doped regions 102c may be distributed over essentially one whole main surface of the semiconductor volume. In case of an elongated shape of the p-doped regions 102c, e.g. the bars, the plurality of p-doped regions 102c may be arranged essentially in parallel. The plurality of p-doped regions 102c may be formed in the intermediate region 102b in such a way that they form part of the one surface of the semiconductor volume 102. They may be separated by parts of the intermediate region 102b. The plurality of p-doped regions 102c may, alternatively or additionally, be separated by at least parts of the dielectric 106.

In various embodiments, each of the plurality of p-doped regions 102c may have a length, measured along its longer dimension along the surface of the semiconductor volume 102, in a range from about 10 μm to about 2 cm, for example around 1 cm. Each of the plurality of p-doped regions 102c may have a width, measured along its shorter dimension along the surface of the semiconductor volume 102, in a range from about 1 μm to about 50 μm, for example around 10 μm.

In various embodiments, the dielectric 106 may be arranged above the plurality of p-doped regions 102c and above the intermediate region 102b, for example above the intermediate region between the p-doped regions 102c. In other words, the dielectric 106 may be formed consecutively over the plurality of individual p-doped regions 102c.

In various embodiments, a plurality of data lines 108 may be arranged over the plurality of p-doped regions 102c, with the dielectric 106 arranged between the plurality of data lines and the plurality of p-doped regions 102c. For example, each one of the plurality of data lines 108 may be arranged over one of the plurality of p-doped regions 102c. In other words, the plurality of p-doped regions 102c and the plurality of data lines 108 may be considered as forming a plurality of p-doped region/data line-pairs, with each pair sandwiching the dielectric 106 between its two parts. Each p-doped region/data line-pair may be considered as forming a capacitor 222, in other words, the plurality of p-doped regions 102c, together with the plurality of data lines 108 and the dielectric 106, may form a plurality of capacitors 222.

An absolute value of the signal 220 that the electron that may at least partially move through the semiconductor volume 102 may generate in the semiconductor detector 103 may be estimated by using a geometry of the semiconductor detector 103 and the number of electron-hole-pairs that may typically be generated by a single fast, e.g. relativistic electron moving through a semiconductor.

In various embodiments, the dielectric 106, which may be an oxide, for example silicon oxide, may have a width of 10 μm, a length of 1 cm and a thickness of 200 nm. The capacitor 222 with these dimensions may have a capacity of $C_{diel}=16$ pF.

A capacity $C_{semi}$ of the semiconductur capacitor 340 may be difficult to estimate, because the semiconductor capacitor 340 may extend also laterally from each of the plurality of p-doped regions 102c. An order of magnitude of the capacity $C_{semi}$ of the semiconductor capacitor 340 may be estimated to be around 1/50 of the capacity $C_{diel}$ of the dielectric 106, e.g. in this case $C_{semi}=0.32$ pF.

The signal 220, in other words the voltage U (or rather a change in voltage ΔU) resulting from a single electron moving at least partially through the semicondcutor detector 103 may be $\Delta U = \Delta Q / C_{semi} = 25000 \times q_0 / 0.3$ pF=13 mV. At least the signal 220 may be in this order of magnitude. If, by means of example, the semiconductor detector has a different geometry, the signal 220 may be different, e.g. for a semiconductor detector with one (large, i.e. larger than each of the plurality of p-doped regions 102c) p-doped region instead of the plurality of p-doped regions 102c, the signal 220, e.g. the change in voltage ΔU, may be smaller than the value cited above by approximately a factor corresponding to a ratio of an area of the p-doped region 102c over an area of the one (large) p-doped region. The signal may for example be around a few μV.

Having an estimate for the capacity $C_{semi}$ of the semiconductor detector 103 (or the semiconductor capacitor 340, respectively) may make it possible to determine an estimate for a maximum frequency f with which the semiconductor detector 103 may be read out, in other words it may be possible to determine a minimal time t that it takes the semiconductor detector 103 after an event to be receptive again for the next event (the relaxation time).

The maximum frequency may be $f=1/(C_{semi} \times R_{semi})^{0.5}=1/(0.3 \text{ pF} \times 0.5 \text{ M}\Omega)^{0.5}=2.6$ kHz, wherein $R_{semi}$ may be a resistance of the intermediate region 102b.

From the above calculations and estimates it may be followed that, for a gamma ray detector 300 according to various embodiments, a count rate of one event per second (which may be considered a minimum count rate) may correspond to a dose rate of 3 μSv/h, which may correspond to about six times a value that may be considered as a value for natural radioactivity.

With a maximum frequency of about 2 kHz, a maximum dose level that may be registered by the gamma ray detector 300 according to various embodiments may be about 5 mSv/h. Dose rates above this level may cause the gamma ray detector 300 to saturate (in other words, to go into overflow).

In various embodiments, the gamma ray detector 300 may have an active range ranging from about 3 μSv/h to about 5 mSv/h.

Various other embodiments, for example gamma ray detectors with different geometries, for example the gamma ray detectors 100, 101 and 200 described in context with FIG. 1A, FIG. 1B and FIG. 2A, as well as the gamma ray detectors 301, 302, 303 and 400 that will be described in context with FIG. 3A to FIG. 3D and FIG. 4, may have different active ranges.

In various embodiments, the output signal 230 shown in FIG. 2B, as applied to the gamma ray detector 300 of FIG. 3A, may be an integrated signal, e.g. an integrated signal for the plurality of data lines 108. Having the p-doped region 102c formed as the plurality of p-doped regions 102c may serve to form the plurality of capacitors 222 and a plurality of corresponding semiconductor capacitors 340. A semiconductor detector 103 in which at least one of the p-doped region 102c, the intermediate region 102b and the n-doped region 102a is not formed as an integral region, but as a plurality of individual regions (in FIG. 3A, this may be the case for the p-doped regions 102c, and in FIG. 3B and FIG. 3C for each of the p-doped regions 102c, the intermediate regions 102b and the n-doped regions 102a), the semiconductor detector 103 may be referred to as a segmented semiconductor detector 103, and the corresponding segmented parts as detector segments. The individual semiconductor capacitors 340 may have a smaller capacity than a single capacitor formed by essentially the whole semiconductor volume 102, like for example shown in FIG. 1A. The charge carriers (electrons and holes) generated by the fast, e.g. relativistic electron passing through the semiconductor substrate 102 may however be expected to accumulate essentially at only one semiconductor capacitor 340 of the plurality of semiconductor capacitors 340. As can be seen from the relationship $\Delta U = \Delta Q / C_{semi}$, a smaller capacity may lead to a larger voltage change (e.g. a voltage increase), and hence to a larger signal. In various embodiments, the signals from the plurality of data lines 108 may be amplified by means of a plurality of amplifier circuits 120. For example, each data line 108 of the plurality of data lines 108 may be coupled, for example electrically conductively connected, to one amplifier circuit 120. Alternatively, a plurality of data lines 108 may be coupled, for example electrically conductively connected, to one amplifier circuit 120.

In various embodiments, all of the data lines 108 may be coupled, for example electrically conductively connected, to one amplifier circuit 120. While spatially resolving the gamma radiation may require an individual amplifier circuit 120 for each of the data lines 108 (or, more generally, for each spatial resolution element), forming an integrated signal for the whole gamma ray detector (i.e., without spatial or spectral resolution) may allow for using just one common amplifier circuit 120 for all of the data lines 108 (if the resistor 232 is formed by the ohmic resistances of each of the data lines, the common amplifier circuit 120 may exclude the resistors 232, in other words, the data lines 108 may be combined to enter the amplifier circuit 120 after having passed their individual resistors 232). Such an arrangement may be possible, because a signal entering the inverting input "−" of the amplifier 236 may immediately cause the signal 238 at the output line 230 to drop, such that the charge caused by the charged particle may flow off through the resistor 234, rather than flowing backwards into the other data lines 108 and getting lost.

Figure 3B:
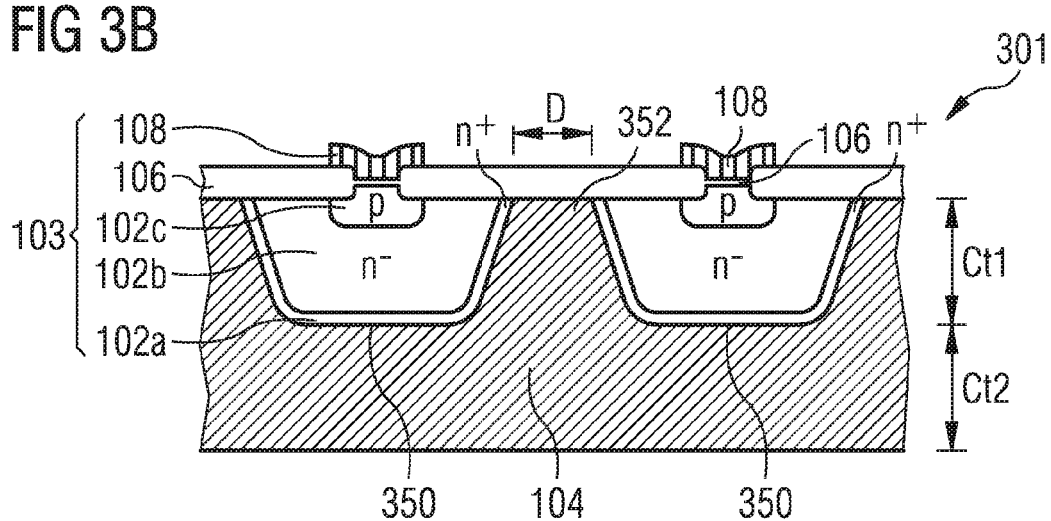

As shown in FIG. 3B, the gamma ray detector 301 may differ from the gamma ray detector 300 described in the context with FIG. 3A mainly by a shape of its intermediate region 102b and of its n-doped region 102a, and by having the semiconductor detector 103 embedded in the converter element 104.

In various embodiments, the intermediate region 102b of the gamma ray detector 301 may be formed as a plurality of intermediate regions 102b, for example as a plurality of intermediate regions 102b, each of which may be formed at least partially around one of the plurality of p-doped regions 102c. Each of the plurality of intermediate regions 102b may be formed as a mantle around one of the p-doped regions 102c (or rather, as half a mantle, since each structure of the p-doped region 102c and the intermediate region 102b formed in a mantle-like manner around it may end at a surface of the substrate). Around the plurality of intermediate regions 102b, a plurality of n-doped regions 102a may be arranged. In other words, around each intermediate region 102b of the intermediate regions 102b one n-doped region 102a of the plurality of n-doped regions 102a may be arranged. Each of the plurality of n-doped regions 102a may be formed as a mantle around one of the intermediate regions 102b (or rather, as half a mantle, since each structure of the p-doped region 102c, the intermediate region 102b formed in a mantle-like manner around the p-doped region 102c and the n-doped region 102a formed in a mantle-like manner around the intermediate region 102b may end at a surface of the substrate).

In other words, rather than having just the p-doped regions 102c bar-shaped, bar-shaped semiconductor detectors 103 may be formed that may have an onion shell (or rather, a half-onion-shell) structure, with the p-doped region 102c in the center, the intermediate region 102b, which may for example be n$^+$-doped, around it, and the n-doped region 102a around the intermediate region 102b.

The dielectric 106 may be formed on or over the p-doped region 102c and over the intermediate region 102b as described above in context with FIG. 3A, with the difference that the dielectric 106 of the gamma ray detector 301 may be in physical contact with the n-doped region 102a and with the converter element 104. The data line 108 may be formed over the p-doped region 102c as described in context with FIG. 3B.

In various embodiments, a distance D between two adjacent n$^-$-doped regions may be between 50 µm and 500 µm, for example in a range from 150 µm to 250 µm, for example around 200 µm.

In various embodiments, the plurality of bar-shaped (or strip-shaped) semiconductor, e.g. silicon, detectors 103 having the data lines 108, which may include metal, and the dielectric 106, which may be an oxide layer, may be at least partially separated, e.g. by means of MEMS-technology. A partial separation by MEMS-technology may be conducted by exposing a p-type substrate (not shown in FIG. 3B or FIG. 3C), in which the detector segments 103 with their n-type regions, e.g. n$^+$-regions, 102a contacting the p-type substrate may be formed, to a hot base while applying a voltage in a range from about 1 V to about 2 V between the n-type regions 102a as anodes and a counter-electrode of an inert metal as a cathode in an electrochemical cell. This arrangement may cause an etching process to occur in the p-type substrate to stop 1 to 2 µm before a pn junction, e.g. a metallurgical pn junction, formed by a contact surface between the p-type substrate and the n-type region 102a.

In various embodiments, the converter element 104 may be filled into spaces 352 between the individual semiconductor detectors 103. For example, the spaces 352 between the individual semiconductor detectors 103 may be filled, e.g. completely filled, with the converter element 104, e.g. with a material including or consisting of a heavy element, for example with a tungsten-nickel alloy W—Ni or with a gold-lead alloy Au—Pb. In the spaces 352, the converter element 104 may have a thickness Ct1, which may be approximately or exactly the same as the thickness of the semiconductor detector 103.

Another part of the converter element 104 may be formed below the plurality of semiconductor detectors 103, for example as a layer. The other part of the converter element 104 may be formed in such a way that bottom surfaces 350 of the plurality of semiconductor detectors 103 are covered by the converter element 104. The other part of the converter element 104 may have a thickness Ct2. The thickness Ct2 may be in a range from about 0.3 mm to about 1.5 mm, for example around 0.7 mm.

In various embodiments, the plurality of semiconductor detectors 103 may be at least partially embedded in the converter element 104. By way of example, the plurality of semiconductor detectors 103 may, up to the dielectric 106, be embedded in the converter element 104.

As another way to describe the structure of the gamma ray detector 301, the converter element 104 may be considered to form (in cross-section) a comb-like structure, and the plurality of semiconductor detectors 103 may be considered as being arranged in openings of the comb-like structure.

In various embodiments, the plurality of semiconductor detectors 103 may be held together for example by means of the dielectric 106 and/or at least one support structure (not shown) that may for example be arranged above the dielectric 106 and/or between and/or below the plurality of semiconductor detectors 103

In various embodiments, the converter element 104 may be formed on the plurality of held-together semiconductor detectors 103 for example by means of dipping the plurality of semiconductor detectors 103 into the material that may form the converter element 104, for example a bath of molten material that may form the converter element 104. The semiconductor detectors 103 may for example be dipped into a eutectic mixture of 85% of lead with 15% of gold, for example at a temperature of 215° C.

In various embodiments, the converter element 104 may for example be formed on the plurality of held-together semiconductor detectors 103 by means of deposition, for example by means of electrodeposition, for example by means of an electrodeposition of gold, lead, a mixture of gold and lead or a mixture of nickel and tungsten.

In various embodiments, the converter element 104 may for example be formed on the plurality of held-together semiconductor detectors 103 by means of fused-salt electrolysis, in which a typically aqaeus electrolyte used for an electrodeposition may be replaced by a molten salt, e.g. a molten metal salt. The fused-salt electrolysis may for example be used for forming the converter element 104 including or consisting of tungsten.

In various embodiments, a solid angle from which the Compton electrons and/or the pair generation electrons generated in the converter element 104 may enter the semiconductor detector 103 may be increased.

In various embodiments, a small area of the semiconductor detector 103, i.e. of each of the semiconductor detectors 103, may lead to a decrease of a leakage current, whereby a signal-to-noise-ratio may be improved.

Figure 3C:
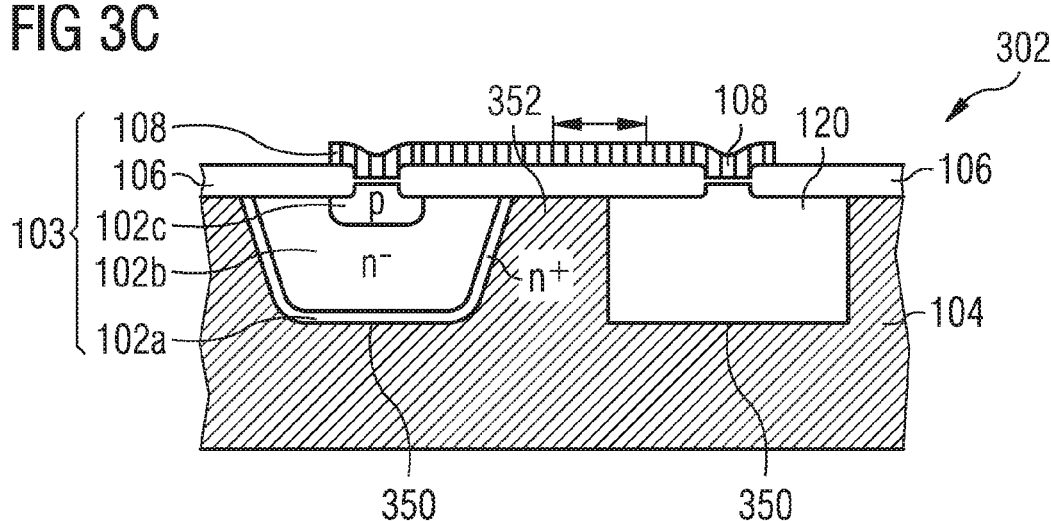

As shown in FIG. 3C, the gamma ray detector 302 may differ from the gamma ray detector 301 described in the context with FIG. 3B mainly in that the plurality of semiconductor detectors 103 and the amplifier circuit 120 may together be embedded in the converter element 104. By way of example, the amplifier circuit 120 may be formed in the semiconductor 102 from which also the plurality of semiconductor detectors 103 may be formed. The amplifier circuit 120 may be separated from an adjacent semiconductor detector 103, for example during the process separating the individual semiconductor detectors 103 described above. Then, in various embodiments, the converter element 104 may be formed in the spaces 352 and over the back sides 350 of a combined structure of the plurality of semiconductor detectors 103 and the amplifier circuit 120, for example as described above in context with FIG. 3B. In other words, the plurality of semiconductor detectors 103 and the amplifier circuit 120 may together be embedded in the converter element 104. The plurality of semiconductor detectors 103, the amplifier circuit 120 and the converter element 104 may form a monolithic structure. As an alternative to being formed from the same semiconductor 102 as the plurality of semiconductor detectors 103, the amplifier circuit 120 may be formed separately. The amplifier circuit 120 may for example be held together with the plurality of semiconductor detectors 103 by means of the dielectric 106 and/or the at least one support structure (not shown) described in context with FIG. 3B, and then the converter element 104 may be formed, for example as described there.

Figure 3D:
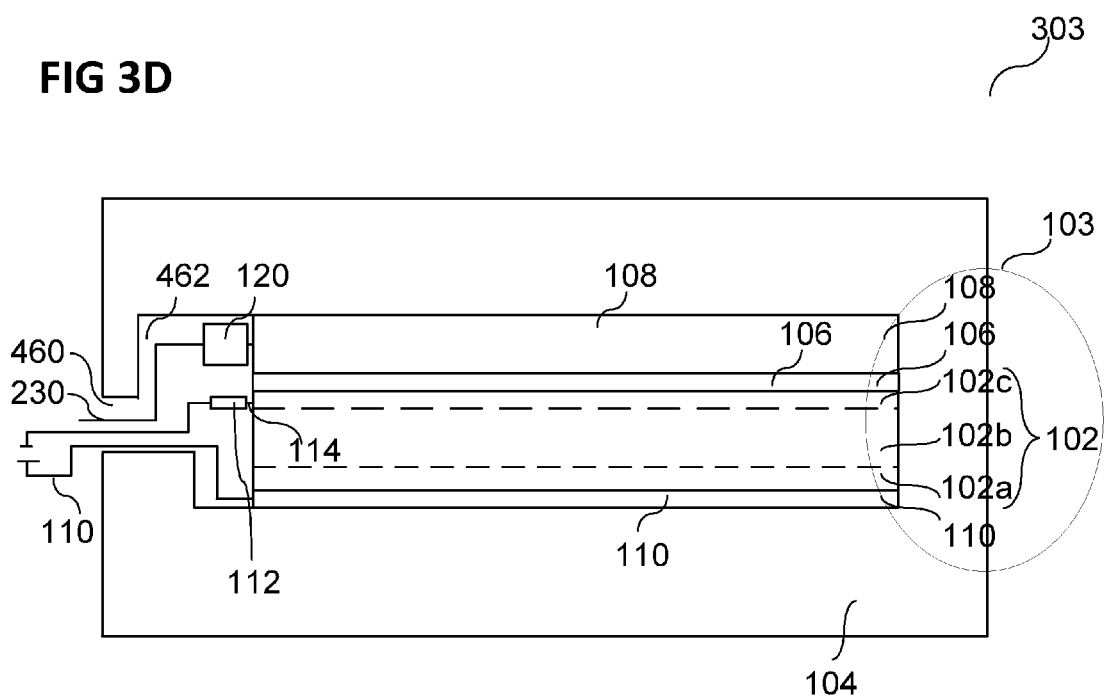

As shown in FIG. 3D, the gamma ray detector 303 may differ from the gamma ray detector 101 described in the context with FIG. 1B mainly in a shape of the converter element 104.

The semiconductor detector 303 and the amplifier circuit 120, irrespective of whether they are formed separately or in an integrated fashion, may in various embodiments be essentially completely enclosed in or be essentially completely surrounded by the converter element 104. By way of example, the converter element 104 may be formed around the semiconductor detector 103 and the amplifier circuit 120 in such a way that it only leaves at least one opening 460 for parts that need to lead in and/or out of a cavity 462 formed by the converter element, for example feed-throughs 460 for at least one power line 110 and/or at least one output line 230.

FIG. 4 provides a table, Table 1, of experimental results obtained with a gamma ray detector according to various embodiments and a comparison gamma ray detector.

In an experimental setup, the gamma ray detector 300 was tested. A gamma ray source providing a dose rate of 92 µSv/h was mounted in 30 cm distance from the gamma ray detector 300.

The converter element 104 was formed from tungsten sheets with a thickness of 50 µm each essentially surrounding the semiconductor detector 103. A total thickness of the converter element 104 was varied by adding or removing tungsten sheets. A comparison semiconductor detector was obtained by removing the converter element 104. Table 1, shown in FIG. 4, summarizes the result.

In the table, angle may refer to an angle between one of the main sides of the semiconductor detector and a radiation direction of the gamma ray source (which may point towards the gamma ray detector).

As can be seen from Table 1, an optimal thickness may be found for the converter element 104 where a total number of counts (which may be a sum of the counts for both angles, 0° and 90°) is high and almost independent of the angle, i.e. the number of counts may be the same or almost the same for an angle of 0° and for an angle of 90°. For the experimental setup with the tungsten sheets, the optimal thickness of the converter element 104 (the tungsten sheets) may be near 100 µm, because for a thickness of 100 µm, the total number of counts is 5180, and the counts for each of the angles deviate from an average of the two counts by less than 7%. For the comparison gamma ray detector without the conversion element 104 (in the table, "none" is listed for the number of tungsten sheets), the total number of counts (5200) may be high, but the comparison gamma ray detector may show a strong dependence on its relative orientation with respect to the gamma ray source, because the counts for the two angles deviate from their average by about 28%. If the converter element 104 is relatively thick (200 µm, i.e. four sheets of tungsten), the total number of counts is lowered slightly to 4950. A reason for this may be that some of the Compton electrons that may be formed in the converter element 104 may not be able to escape the converter element 104. Furthermore, the experimental gamma ray detector may show a relatively strong dependence on its relative orientation with respect to the gamma ray source, because the counts for the two angles deviate from their average by about 22%. Here, the count rate is higher if the gamma ray detector faces the gamma ray source with one of its main sides. Since the count rate for the 90° angle for the 100 µm tungsten layer is higher than for the 0° angle, the optimum thickness of the tungsten layer 104 for the experimental gamma ray detector may be slightly lower than 100 µm.

In various embodiments, several gamma ray detector parameters, for example the thickness of the converter element 104, a relative arrangement of the converter element 104 with respect to the semiconductor detector 103, length, width and/or thickness of the semiconductor detector 103, etc., may be optimized experimentally or by means of theoretical considerations. Thereby, the count rate and/or the orientation dependence of the gamma ray detector may be optimized. For example, the orientation dependence may be almost or essentially eliminated. In various embodiments, this may be achieved by arranging the converter element 104 symmetrically with respect to the semiconductor detector 103, for example along two opposite sides, e.g. main sides, of the semiconductor detector 103, or for example essentially completely surrounding the semiconductor detector 103 (e.g. as shown in FIG. 3D).

FIG. 5 shows a perspective view of a gamma ray detector 400 in accordance with various embodiments.

Parts, parameters, materials, functions etc. of the gamma ray detector 400 may be similar or identical to those described in connection with the gamma ray detectors described above.

In various embodiments, the gamma ray detector 400 may include the semiconductor detector 103 that may be mounted, for example fixed, on a converter element 104. The converter element 104 may also function as a housing or as a partial housing. The semiconductor detector 103 may be mounted on the converter element 104 with one of its main sides facing one of the main sides of the converter element 104. In various embodiments, the semiconductor detector 103 may be mounted directly on the converter element 104, for example by means of a holding structure (not shown), for example by means of clamps, screws or the like. In various embodiments, the semiconductor detector 103 may be mounted on the converter element 104 by means of a fixing agent (not shown), for example the semiconductor detector 103 may be glued or soldered to the converter element 104.

In various embodiments, the amplifier circuit 120 may be mounted on the converter element 104. By way of example, the amplifier circuit 120 may be mounted on one of the main sides of the converter element 104, for example on the same main side of the converter element 104 as the semiconductor detector 103. In this way, both the semiconductor detector 103 and the amplifier circuit 120 may be at least partially shielded from unwanted electromagnetic radiation, while at the same time the converter element 104 may cover a large fraction of a complete surface of the semiconductor detector 103, for example almost half, for example between 40% and 50%, of the complete surface of the semiconductor 103. A larger coverage may for example be obtained by forming an opening, e.g. a cavity, in the converter element 104 and placing the semiconductor detector 103 in the opening. By the large fraction of the surface of the semiconductor detector 103 being covered by the converter element 104, a correspondingly large solid angle may be formed from which the fast, e.g. relativistic electrons may enter the semiconductor detector 103.

In various embodiments, despite the at least partial shielding, the amplifier circuit 120 may, for example in a case of a high level of radiation, for example a high level of gamma radiation, but also in case of a high level of alpha-, beta-, other particle radiation or electromagnetic fields, be exposed to a radiation level that may interfere with its operation. For lowering a risk of a failure of the amplifier circuit 120, a so-called radiation hardened device may be used for the amplifier circuit 120.

In various embodiments, the power supply 122, for example an A/D-converter that may receive power by means of connectors 572 and may provide suitable power, for example a direct voltage of below 5 V, to the semiconductor detector 103 by means of the first electrode 114 and the second electrode 110, may be arranged on the converter element 104, for example on the same main side of the converter element 104 as the semiconductor detector 103.

In various embodiments, the semiconductor detector 103, the amplifier circuit 120 and/or the power supply 122 may be formed separately. By way of example, the semiconductor detector 103 may be formed as a chip, the amplifier circuit 120 may be formed as another chip, and the power supply 122 may be formed as a third chip.

Alternatively, at least two of the three elements may be formed monolithically, for example the semiconductor detector 103, the amplifier circuit 120 and the power supply 122 may be formed monolithically. By way of example, the semiconductor detector 103 and the amplifier circuit 120 may be formed on the same chip, the semiconductor detector 103 and the power supply 122 may be formed on the same chip, the amplifier circuit 120 and the power supply 122 may be formed on the same chip or for example all three may be formed on the same chip.

In various embodiments, the connectors 572 for the power supply, and/or the data output connector 572 may be arranged in the converter element 104. Alternatively, they may for example be formed on the converter element.

In various embodiments, the gamma ray detector 400 and/or any of the other embodiments of gamma ray detectors described above, may be arranged in a housing. The housing may serve as a protective casing, for example for protecting the gamma ray detector from dust, light, humidity, (visible) light, etc. Alternatively or additionally, the housing may provide elements with an additional functionality, e.g. a display for displaying the counts, dose rate etc., an input device for choosing different options, etc. In other words, in various embodiments, the gamma ray detectors described above may serve as a stand-alone gamma ray detector, for example for professional use, e.g. in a hospital.

In various embodiments, any of the embodiments of gamma ray detectors described above may be arranged in a mobile communication device, for example in a mobile phone, in a laptop, in a tablet etc. In other words, a mobile communication device, e.g. a mobile phone, with a capability of detecting gamma radiation by means of a gamma ray detector may be provided, with the gamma ray detector including a converter element, configured to release a fast, e.g. relativistic electron when a gamma ray moves at least partially through the converter element; a semiconductor detector, arranged to receive the fast, e.g. relativistic electron and configured to produce a signal when the fast, e.g. relativistic electron moves at least partially through the semiconductor detector; and an amplifier circuit, coupled to the semiconductor detector and configured to amplify the signal produced by the semiconductor detector; wherein the converter element is arranged to at least partially shield the amplifier circuit from electromagnetic radiation.

FIG. 6 shows a method 500 of forming a gamma ray detector in accordance with various embodiments.

The method 500 of forming a gamma ray detector may include providing a gamma ray detector including a converter element, configured to release an electron, e.g. a fast, e.g. relativistic electron when a gamma ray moves at least partially through the converter element; and a semiconductor detector, wherein the semiconductor detector may include at least one p-doped region; at least one n-doped region; at least one intermediate region, separating the at least one p-doped region from the at least one n-doped region, wherein the at least one intermediate region may have a lower dopant concentration than the at least one p-doped region and the at least one n-doped region; at least one first electrode electrically contacting the at least one p-doped region; and at least one second electrode electrically contacting the at least one n-doped region (in 5010).

The method of forming a gamma ray detector may further include providing a supply voltage to the first electrode and a second supply voltage to the second electrode, wherein the second supply voltage may be higher than the first supply voltage and wherein a voltage difference between the first and the second electrodes may be below 5 V (in 5020).

The method of forming a gamma ray detector may further include detecting a signal caused in the semiconductor detector when the (e.g. fast, e.g. relativistic) electron moves at least partially through the semiconductor substrate (in 5030).

In various embodiments, a gamma ray detector may be provided. The gamma ray detector may include a converter element, configured to release an electron, e.g. a fast, e.g. relativistic electron when a gamma ray moves at least partially through the converter element. The gamma ray detector may further include a semiconductor detector, arranged to receive the (e.g. fast, e.g. relativistic) electron and configured to produce a signal when the (e.g. fast) electron moves at least partially through the semiconductor detector; an amplifier circuit, coupled to the semiconductor detector and configured to amplify the signal produced by the semiconductor detector; and a shielding essentially completely surrounding the semiconductor detector and the amplifier circuit. In the gamma ray detector, the converter element may form at least part of the shielding.

In various embodiments, the semiconductor detector may include at least one p-doped region; at least one n-doped region; at least one intermediate region, separating the at least one p-doped region from the at least one n-doped region, wherein the at least one intermediate region may have a lower dopant concentration than the at least one p-doped region and the at least one n-doped region; at least one first electrode electrically contacting the at least one p-doped region; and at least one second electrode electrically contacting the at least one n-doped region.

In various embodiments, the converter element may be adjacent to at least one surface of the semiconductor detector.

In various embodiments, the intermediate region may be an intrinsic region.

In various embodiments, the intermediate region may be an n-doped region.

In various embodiments, the gamma ray detector may further include a power supply configured to supply a first supply voltage to the first electrode and a second supply voltage to the second electrode, wherein the second supply voltage may be higher than the first supply voltage.

In various embodiments, a voltage difference between the first and second electrodes may be below 5 V.

In various embodiments, the converter element may include a heavy metal or an oxide of a heavy metal.

In various embodiments, the converter element may include at least one material of a group of materials, the group consisting of: lead; tungsten; molybdenum; gold; a lead-gold alloy; a tungsten-nickel alloy and an oxide of the aforementioned materials.

In various embodiments, the converter element may extend along at least two sides of the semiconductor detector and the amplifier circuit.

In various embodiments, the converter element may form the complete shielding.

In various embodiments, the semiconductor detector may include a plurality of detector segments.

In various embodiments, at least a portion of the converter element may be disposed between the detector segments.

In various embodiments, the semiconductor detector may include at least one material of a group of materials, the group consisting of: silicon; germanium; a III-V compound semiconductor; a II-VI compound semiconductor; and a IV-IV compound semiconductor.

In various embodiments, the semiconductor detector may be configured as a chip.

In various embodiments, a gamma ray detector may be provided. The gamma ray detector may include a converter element, configured to generate Compton electrons from incident gamma radiation; a semiconductor detector configured to detect the Compton electrons and produce a corresponding detector signal; an amplifier circuit configured to amplify the detector signal, and a shielding essentially completely surrounding the semiconductor detector and the amplifier circuit; wherein the converter element may form at least part of the shielding.

In various embodiments, the converter element may include a heavy metal or an oxide of a heavy metal.

In various embodiments, the converter element may form the complete shielding.

In various embodiments, a method for detecting gamma radiation may be provided, including providing a gamma ray detector including a converter element, configured to release an electron, e.g. a fast, e.g. relativistic electron when a gamma ray moves at least partially through the converter element; and a semiconductor detector, wherein the semiconductor detector may include at least one p-doped region; at least one n-doped region; at least one intermediate region, separating the at least one p-doped region from the at least one n-doped region, wherein the at least one intermediate region may have a lower dopant concentration than the at least one p-doped region and the at least one n-doped region; at least one first electrode electrically contacting the at least one p-doped region; and at least one second electrode electrically contacting the at least one n-doped region; providing a supply voltage to the first electrode and a second supply voltage to the second electrode, wherein the second supply voltage may be higher than the first supply voltage and wherein a voltage difference between the first and the second electrodes may be below 5 V; and detecting a signal caused in the semiconductor detector when the (e.g. fast, e.g. relativistic) electron moves at least partially through the semiconductor substrate.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

What is claimed is:

1. A gamma ray detector, comprising:
  a converter element, configured to release an electron when a gamma ray moves at least partially through the converter element;
  a semiconductor detector, arranged to receive the electron and configured to produce a signal when the electron moves at least partially through the semiconductor detector;
  an amplifier circuit, coupled to the semiconductor detector and configured to amplify the signal produced by the semiconductor detector; and
  a shielding essentially completely surrounding the semiconductor detector and the amplifier circuit,
  wherein the converter element forms at least part of the shielding; and
  wherein the semiconductor detector is in direct physical contact with the converter element.

2. The gamma ray detector of claim 1,
  wherein the semiconductor detector comprises:
  at least one p-doped region;
  at least one n-doped region;
  at least one intermediate region, separating the at least one p-doped region from the at least one n-doped region, wherein the at least one intermediate region has a lower dopant concentration than the at least one p-doped region and the at least one n-doped region;
  at least one first electrode electrically contacting the at least one p-doped region; and
  at least one second electrode electrically contacting the at least one n-doped region.

3. The gamma ray detector of claim 2,
  wherein the intermediate region is an intrinsic region.

4. The gamma ray detector of claim 1,
  wherein the converter element is adjacent to at least one surface of the semiconductor detector.

5. The gamma ray detector of claim 1,
  wherein the converter element comprises a heavy metal or an oxide of a heavy metal.

6. The gamma ray detector of claim 1,
  wherein the converter element comprises at least one material of a group of materials, the group consisting of:
  lead;
  tungsten;
  molybdenum;
  gold;
  a lead-gold alloy;
  a tungsten-nickel alloy and
  an oxide of the aforementioned materials.

7. The gamma ray detector of claim 1,
  wherein the semiconductor detector comprises a plurality of detector segments.

8. The gamma ray detector of claim 1,
wherein the semiconductor detector comprises at least one material of a group of materials, the group consisting of:
silicon;
germanium;
a III-V compound semiconductor;
a II-VI compound semiconductor; and
a IV-IV compound semiconductor.

9. The gamma ray detector of claim 1,
wherein the semiconductor detector is configured as a chip.

10. A gamma ray detector, comprising:
a converter element, configured to generate Compton electrons from incident gamma radiation;
a semiconductor detector configured to detect the Compton electrons and produce a corresponding detector signal;
an amplifier circuit configured to amplify the detector signal; and
a shielding essentially completely surrounding the semiconductor detector and the amplifier circuit,
wherein the converter element forms the complete shielding.

11. The gamma ray detector of claim 10, wherein the converter element comprises a heavy metal or an oxide of a heavy metal.

12. A gamma ray detector, comprising:
a converter element, configured to release an electron when a gamma ray moves at least partially through the converter element;
a semiconductor detector, arranged to receive the electron and configured to produce a signal when the electron moves at least partially through the semiconductor detector;
an amplifier circuit, coupled to the semiconductor detector and configured to amplify the signal produced by the semiconductor detector; and
a shielding essentially completely surrounding the semiconductor detector and the amplifier circuit,
wherein the converter element forms at least part of the shielding;
wherein the semiconductor detector comprises:
at least one p-doped region;
at least one n-doped region;
at least one intermediate region, separating the at least one p-doped region from the at least one n-doped region, wherein the at least one intermediate region has a lower dopant concentration than the at least one p-doped region and the at least one n-doped region;
at least one first electrode electrically contacting the at least one p-doped region; and
at least one second electrode electrically contacting the at least one n-doped region;
wherein the intermediate region is an n-doped region.

13. A gamma ray detector, comprising:
a converter element, configured to release an electron when a gamma ray moves at least partially through the converter element;
a semiconductor detector, arranged to receive the electron and configured to produce a signal when the electron moves at least partially through the semiconductor detector;
an amplifier circuit, coupled to the semiconductor detector and configured to amplify the signal produced by the semiconductor detector;
a shielding essentially completely surrounding the semiconductor detector and the amplifier circuit, and
a power supply configured to supply a first supply voltage to the first electrode and a second supply voltage to the second electrode, wherein the second supply voltage is higher than the first supply voltage;
wherein the converter element forms at least part of the shielding;
wherein the semiconductor detector comprises:
at least one p-doped region;
at least one n-doped region;
at least one intermediate region, separating the at least one p-doped region from the at least one n-doped region, wherein the at least one intermediate region has a lower dopant concentration than the at least one p-doped region and the at least one n-doped region;
at least one first electrode electrically contacting the at least one p-doped region; and
at least one second electrode electrically contacting the at least one n-doped region.

14. The gamma ray detector of claim 13, wherein a voltage difference between the first and second electrodes is below 5 V.

15. A gamma ray detector, comprising:
a converter element, configured to release an electron when a gamma ray moves at least partially through the converter element;
a semiconductor detector, arranged to receive the electron and configured to produce a signal when the electron moves at least partially through the semiconductor detector;
an amplifier circuit, coupled to the semiconductor detector and configured to amplify the signal produced by the semiconductor detector; and
a shielding essentially completely surrounding the semiconductor detector and the amplifier circuit,
wherein the converter element forms at least part of the shielding;
wherein the converter element extends along at least two sides of the semiconductor detector and the amplifier circuit.

16. A gamma ray detector, comprising:
a converter element, configured to release an electron when a gamma ray moves at least partially through the converter element;
a semiconductor detector, arranged to receive the electron and configured to produce a signal when the electron moves at least partially through the semiconductor detector;
an amplifier circuit, coupled to the semiconductor detector and configured to amplify the signal produced by the semiconductor detector; and
a shielding essentially completely surrounding the semiconductor detector and the amplifier circuit,
wherein the converter element forms at least part of the shielding;
wherein the converter element forms the complete shielding.

17. A gamma ray detector, comprising:
a converter element, configured to release an electron when a gamma ray moves at least partially through the converter element;
a semiconductor detector, arranged to receive the electron and configured to produce a signal when the electron moves at least partially through the semiconductor detector;

an amplifier circuit, coupled to the semiconductor detector and configured to amplify the signal produced by the semiconductor detector; and a shielding essentially completely surrounding the semiconductor detector and the amplifier circuit, wherein the converter element forms at least part of the shielding;

wherein the semiconductor detector comprises a plurality of detector segments; and wherein at least a portion of the converter element is disposed between the detector segments.

* * * * *